United States Patent [19]

Rivenbark

[11] 4,297,223
[45] Oct. 27, 1981

[54] METHOD AND APPARATUS FOR FORMING A CHLORINE-WATER SOLUTION AND FOR UTILIZING THE SAME TO DISINFECT WATER LINES AND THE LIKE

[75] Inventor: Morrison Rivenbark, Kinston, N.C.

[73] Assignee: Douglas R. Smith, Kinston, N.C.

[21] Appl. No.: 172,679

[22] Filed: Jul. 28, 1980

[51] Int. Cl.³ .............................................. C02B 3/06
[52] U.S. Cl. .................................. 210/754; 210/205;
422/37; 422/282; 422/292
[58] Field of Search .................... 210/94, 95, 205, 206,
210/170, 747, 754–756; 422/261, 282, 292, 37

[56] References Cited

U.S. PATENT DOCUMENTS

| 1,504,775 | 8/1924 | Miller | 422/292 X |
| 3,420,376 | 1/1969 | Smith | 210/95 |
| 4,019,530 | 4/1977 | Chanaroga | 422/261 |
| 4,115,270 | 9/1978 | Phillips | 210/754 |
| 4,116,834 | 9/1978 | King | 210/101 X |
| 4,208,376 | 6/1980 | Sangster et al. | 422/261 |

Primary Examiner—John Adee
Attorney, Agent, or Firm—Mills & Coats

[57] ABSTRACT

The present invention entails a chlorinator having a chlorine tank and a mixing tank and an inlet water line for receiving water from a source and dividing the water into two flows, one flow being directed into the chlorine tank while the other flow is directed into the mixing tank. Water directed into the chlorine tank is directed through chlorine so as to form a chlorine-water solution that is in turn directed to the mixing tank where this solution is mixed with water to form a final chlorine-water solution. This final chlorine-water solution can then be directed through a system of water lines to sterilize and disinfect the same. For convenience, the chlorinator is preferably built in an assembly form and is adapted to be interconnected within a water system such that the same can be interconnected between a source of water and the respective system of lines to be disinfected.

9 Claims, 2 Drawing Figures

METHOD AND APPARATUS FOR FORMING A CHLORINE-WATER SOLUTION AND FOR UTILIZING THE SAME TO DISINFECT WATER LINES AND THE LIKE

BACKGROUND OF INVENTION

It is appreciated that chlorine solutions are widely used as disinfectants. One area of particular use is in newly installed water lines such as found in city and county water systems. Typically before placing such lines in public use, a chlorine solution is formed and directed through the newly installed water lines, disinfecting the lines in the process.

In the past the task of disinfecting such water lines has been troublesome, inconvenient, and has required substantial time and labor. Generally the chlorine solution would be formed and mixed in a large container such as a barrel or a tank and placed at the site of the water lines. The formed chlorine solution would then be pumped from the barrel or container by a portable gasoline engine and pump. Obviously this is a cumbersome, expensive and a very inefficient process largely because often the entire solution had to be transported to the site of the water line system to be treated.

SUMMARY OF INVENTION

The present invention overcomes the problems enumerated above by providing a chlorinator that is designed to simply connect into the water system having the water lines to be disinfected. That is the chlorinator includes an output line that is coupled to a system of water lines to be disinfected. The same chlorinator has an inlet line that is connected to a source of water that is already provided near the site of the water lines to be disinfected and which in fact forms a part of the total water system.

The chlorinator is provided with a chlorine tank and a mixing tank. An inlet water line is communicatively connected to both the chlorine tank and the mixing tank and is adapted to split the flow such that water therefrom is directed to both the chlorine tank and the mixing tank. Water directed to the chlorine tank is circulated through chlorine crystals therein to form a relatively concentrated chlorine-water solution that is in turn directed to the mixing tank where the same is mixed with water from the inlet water line to form a final disinfecting chlorine-water solution. This final chlorine-water solution is directed out the outlet of a chlorinator into the water lines to be disinfected.

It is, therefore, an object of the present invention to provide a method and apparatus for forming a chlorine solution and utilizing that formed solution to disinfect a system of water lines wherein the method and apparatus is relatively simple, inexpensive, convenient to use, and efficient.

Still a further object of the present invention resides in a method of sterilizing a system of water lines wherein the water source that forms the chlorine solution forms a part of the water system actually including the water lines to be disinfected.

Another object of the present invention is to provide a chlorinator for carrying out the above method wherein the chlorinator is adapted to connect to a source of water and to utilize this source of water to continuously form a chlorine solution by selectively diverting a portion of the water through a chlorine tank to form a chlorine solution and then mixing that chlorine solution with water from the same water source to form a final chlorine solution which is directed out an outlet line of the chlorinator into and through the water lines to be disinfected.

Another object of the present invention resides in the provision of a chlorinator of the character described above that is portable in nature, easy to handle and which can be conveniently carried from one site to another for the purpose of disinfecting water lines.

It is a further object of the present invention to provide a chlorinator of the character described above that is designed such that the final level of chlorine concentration within the final chlorine-water solution can be varied and adjusted.

Other objects and advantages of the present invention will become apparent from a study of the following description and the accompanying drawings which are merely illustrative of the present invention.

CHLORINATOR AND METHOD OF STERILIZING WATER LINES

Figure 1:
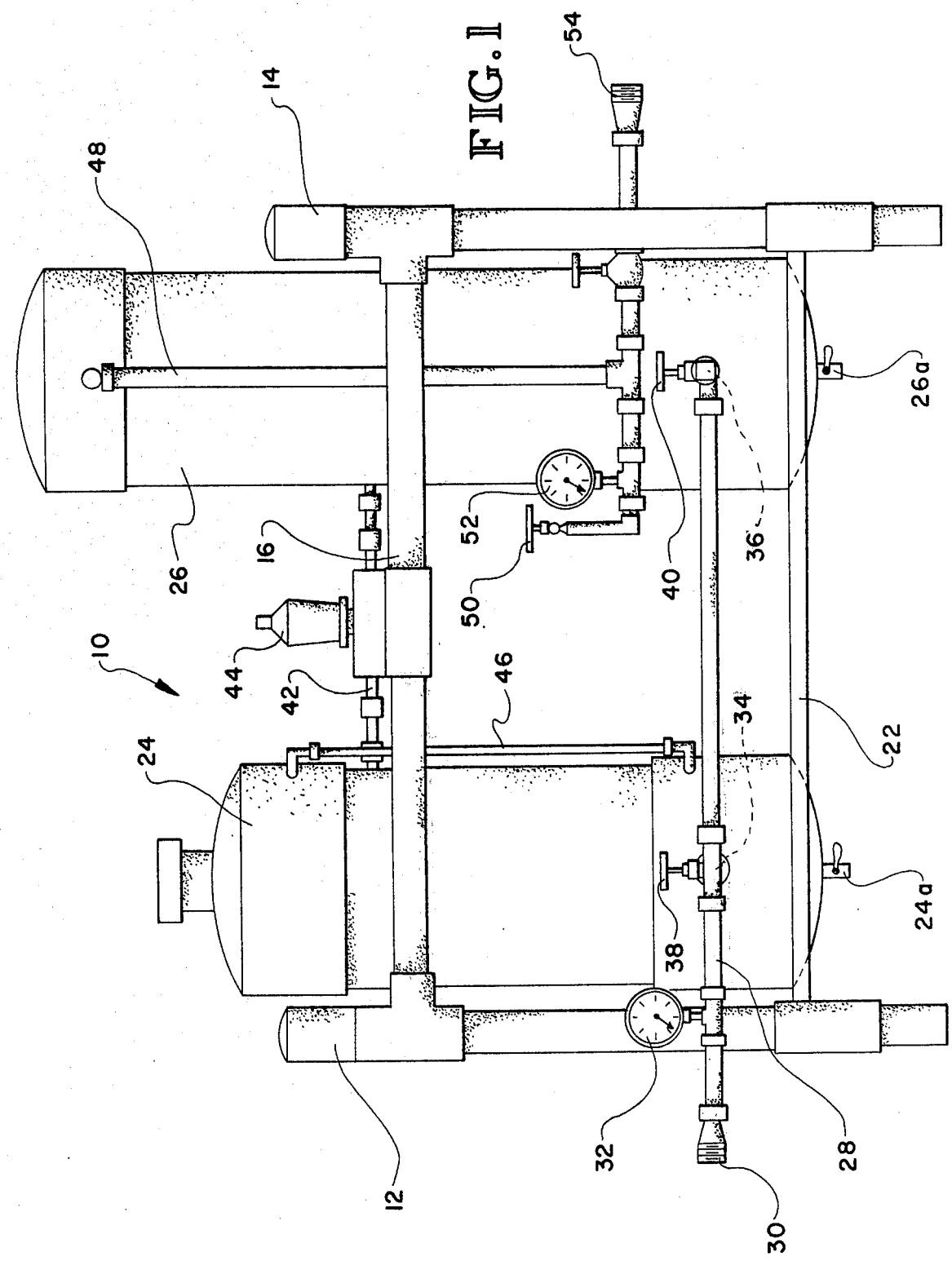
FIG. 1 is a front elevational view of the chlorinator of the present invention.
Figure 2:
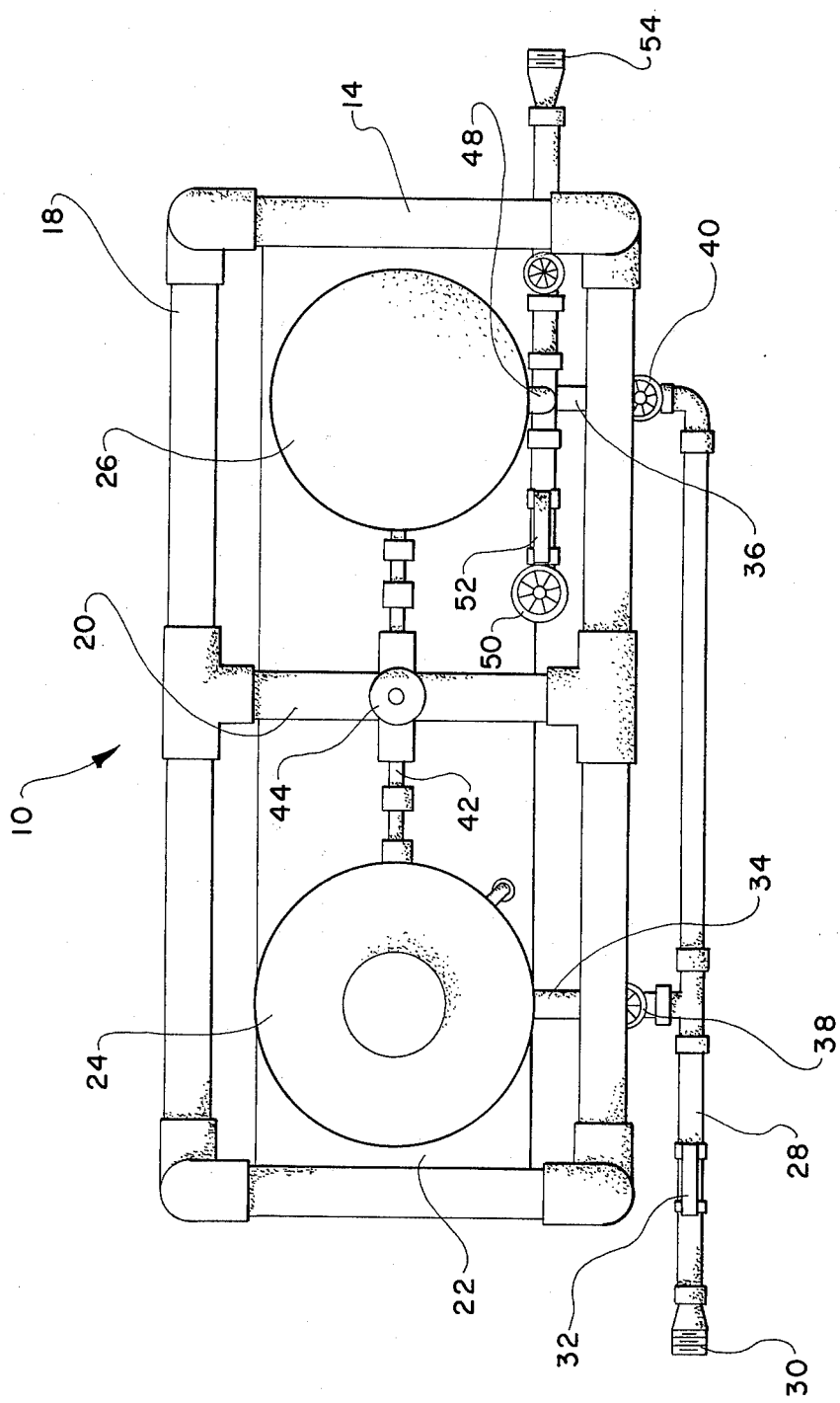
FIG. 2 is a top plan view of the chlorinator of the present invention.

With further reference to the drawings, the chlorinator of the present invention is shown therein and indicated generally by the numeral 10.

First, chlorinator 10 includes a support frame structure that includes two side inverted U-shaped member assemblies 12 and 14. U-shaped member assemblies 12 and 14 are interconnected by side members 16 and 18 and there is provided a middle interconnecting member 20 connected therebetween. Below side members 16 and 18, there is provided a horizontal support panel 22 that is connected between the inverted U-shaped member assemblies 12 and 14.

A chlorine tank 24 is supported on one side of said support panel 22 and includes a drain opening 24a extending therefrom and extending through support panel 22. Chlorine tank 24 is adapted to contain chlorine such as chlorine crystals. As will be understood from subsequent portions of this disclosure, this enables water passing within chlorine tank 24 to mix with the chlorine to produce a chlorine-water solution. Further as seen in the drawings, chlorine tank 20 is provided with a vertical level gauge 46.

Disposed adjacent chlorine tank 24 and supported by support panel 22 within the frame structure of the chlorinator 10, there is provided an upright mixing tank 26. Mixing tank 26 also includes a drain plug 26a that extends through support panel 22.

Chlorinator 10 further includes an inlet water line 28 that includes an inlet end 30 that is adapted to be connected to a source of water that will supply water to the chlorinator 10. Inlet water line 28 further includes a pressure gauge 32, a chlorine tank branch supply line 34 and a mixing tank branch supply line 36. It is appreciated that these two branch supply lines 34 and 36 function to direct water from inlet water line 28 to the chlorine and mixing tanks 24 and 26, respectively.

For effectively dividing the flow within inlet line 28, chlorine tank branch supply line 34 includes a gate valve 38 while mixing tank branch supply line 36 includes a second gate valve 40. By appropriately adjusting either or both of the gate valves 38 and 40, it is appreciated that the quantity of water directed from the inlet line 28 to the chlorine tank 24 and mixing tank 26 can be adjustably varied.

In addition, there is provided an interconnecting line 42 extending between the chlorine tank 24 and mixing tank 26. Interconnecting line 42 is provided with a valve 44 that can be adjusted in cooperation with valves 40 and 42 to provide the desired amount of chlorine solution or chlorine-water solution being transferred from the chlorine tank 24 to the mixing tank 26.

Provided about the mixing tank 26 is an outlet line 48 that in the design shown herein extends downwardly where the same joins a horizontal line including a valve 50, pressure gauge 52 and an outlet line 54.

In use, chlorinator 10 of the present invention is particularly designed to be utilized to sterilize or disinfect water lines of the type commonly found in county and municipal water systems. However, other uses may be made of the chlorinator. Where a new system of water lines have been laid in a housing development, for example, it is required that the lines be disinfected prior to their public use.

In order to achieve this with chlorinator 10 of the present invention, it is transferred to the site of the water lines to be disinfected. It is appreciated that a source of water can ordinarily be found in this vicinity since these lines will have to be ultimately connected to a supply line. Consequently chlorinator 10 can be utilized by coupling inlet end 30 of the inlet water line 28 to a supply of water which may be the main water line that will feed the pipes to be disinfected. Outlet end 54 of outlet line 48 is then coupled to an inlet line of the system of pipes or conduits to be disinfected.

Next the source of water is actuated such that water flows therefrom into inlet water line 28 where the flow of water is divided, one portion of the flow being directed into the chlorine branch supply line 34 while the remaining portion will be directed into the mixing tank branch supply line 36. The quantity of flow directed to each line can be adjusted by adjusting the valves 38 and 40 together and to some limited extent by adjusting the valves individually. This results in a flow of water from inlet water line 38 into the chlorine tank 24, and a flow of water from the inlet water line 28 into mixing tank 26.

As the water moves through chlorine tank 24 because of the presence of chlorine therein, the water passing therein will absorb the chlorine and produce a chlorine-water solution. Relatively speaking this will be a concentrated chlorine-water solution and will be directed through interconnecting line 42 into the mixing tank 26. Here the chlorine-water solution formed in the chlorine tank 24 is mixed with water from the water source to form a final disinfecting chlorine-water solution that would obviously be less concentrated than the chlorine-water solution emerging from chlorine tank 24. It is also appreciated that valve 44 disposed within interconnected line 42 can be appropriately adjusted in relationship to valves 38 and 40 to arrive at a desired chlorine concentration level in the final chlorine-water solution.

This final chlorine-water solution leaving mixing tank 26 is directed out the outlet line 48 into the system of lines being disinfected. It is appreciated that the system of lines to be disinfected could include a main water line and various branching and feeding lines extending therefrom which may in turn feed other lines. It is also appreciated that once the final chlorine-water solution has reached the end of any one line that the same can be plugged or stopped in order that lines down stream therefrom can be fed with the final chlorine-water solution of the present invention.

It is thusly appreciated from the foregoing specification and discussion that the chlorinator of the present invention is particularly useful inasmuch as it uses as a source of water from the water system itself. This is particularly significant in that the chlorinator 10 is designed to automatically mix and form an appropriate chlorine-water solution while being coupled within the water system being treated with chlorine. This obviates the necessity of forming the chlorine-water solution at an inlet area of the system of pipes to be disinfected and having to pump the chlorine solution through the pipes with a portable gasoline engine and associated pump.

In particular, it should be appreciated that the basic apparatus of the present invention could be utilized to mix any chemical, solution, composition or the like with any other solution to form a mixed solution or composition.

The terms "upper", "lower", "forward", "rearward", etc., have been used herein merely for the convenience of the foregoing specification and in the appended claims to describe the chlorinator and its parts as oriented in the drawings. It is to be understood, however, that these terms are in no way limiting to the invention since the chlorinator may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A chlorinator design for such use as sterilizing water lines and the like comprising: a chlorine tank having chlorine therein and adapted to receive water therein and to form a concentrated chlorine water solution; mixing tank means for receiving both water and the concentrated chlorine-water solution from said chlorine tank and mixing the two together to form a mixed chlorine solution; line means communicatively connected between said chlorine tank and said mixing tank for transferring the concentrated chlorine-water solution from said chlorine tank to said mixing tank; inlet water line means operatively connected to both said chlorine tank and said mixing tank for simultaneously directing water to both said chlorine tank and said mixing tank wherein the circulation of water through said chlorine tank forms the concentrated chlorine-water solution and wherein the water directed to said mixing tank acts to combine with said concentrated chlorine-water solution to form a final mixed chlorine solution; valve means operatively associated with said chlorine tank for adjusting the flow of water directed through said chlorine tank from said inlet water line means; and outlet line means communicatively connected to said mixing tank and extending therefrom for directing the mixed chlorine solution from said mixing tank, whereby the formed chlorine solution can be directed through water lines or the like for sterilizing the same.

2. The chlorinator of claim 1 wherein said inlet water line means includes a chlorine tank supply line that leads to said chlorine tank and a mixing tank supply line that leads to said mixing tank and wherein said valve means includes a first control valve operatively interconnected in said chlorine tank supply line for controlling the flow of water from said inlet water line to said chlorine tank.

3. The chlorinator of claim 2 wherein said valve means further includes a second valve operatively interconnected within said line communicatively connected between said chlorine tank and said mixing tank.

4. The chlorinator of claim 3 wherein said valve means further includes a third valve operatively interconnected in said mixing tank supply line leading from said inlet water line to said mixing tank.

5. The chlorinator of claim 2 wherein the same includes a frame structure for supporting said chlorine and mixing tanks within said frame structure including a horizontal support member that extends transversely thereacross that engages and supports both said chlorine and mixing tanks.

6. The chlorinator of claim 5 including drain means operatively associated with the bottom portion of both said chlorine tank and said mixing tank.

7. A method of forming a chlorine solution and sterilizing water lines with the formed chlorine solution comprising the steps of: directing water from a water source into an inlet water line; dividing the water directed into said water inlet line into two separate flows; directing one of the separate flows from said inlet water line into a chlorine tank having chlorine therein and circulating the water through the chlorine tank to form a water-chlorine solution; directing the formed water-chlorine solution to a mixing tank; directing the other separated flow in said inlet water line into said mixing tank where the water joins the already formed waerchlorine solution; mixing the water-chlorine solution and the water from the inlet water line together to form a final sterilizing water-chlorine solution; and directing the final sterilizing water-chlorine solution into a system of water lines for sterilizing the same.

8. The method of claim 7 further including the step of adjusting the flow of water from the water inlet line to the chlorine and mixing tanks in order to achieve a desired chlorine concentration in the final water-chlorine solution.

9. An apparatus for mixing one composition with a liquid such as water to form a mixed solution, comprising an inlet line including means for connecting the same to a source of liquid; a solution tank having a mixing composition therein and communicatively connected to said inlet liquid line for receiving liquid therefrom wherein the circulation of liquid through said solution tank forms a concentrated solution; a mixing tank communicatively connected to said inlet liquid line for receiving liquid therefrom; valve means operatively associated with said solution tank for adjusting the flow of liquid directed through said solution tank from said inlet liquid line; line means communicatively connected between said solution tank and said mixing tank for transferring the concentrated solution from said solution tank to said mixing tank resulting in the mixing of said concentrated solution with liquid in said mixing tank to form a mixed final solution; outlet line means communicatively connected to said mixing tank and extending therefrom for directing the mixed final solution from said mixing tank.

* * * * *